(12) United States Patent
Salsman

(10) Patent No.: US 9,285,389 B2
(45) Date of Patent: Mar. 15, 2016

(54) OPTICAL ACCELEROMETERS

(71) Applicant: Semiconductor Components Industries, LLC, Phoeniz, AZ (US)

(72) Inventor: Kenneth Edward Salsman, Pleasanton, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 58 days.

(21) Appl. No.: 13/854,343

(22) Filed: Apr. 1, 2013

(65) Prior Publication Data

US 2013/0255380 A1     Oct. 3, 2013

Related U.S. Application Data

(60) Provisional application No. 61/619,369, filed on Apr. 2, 2012.

(51) Int. Cl.
*G01B 11/26* (2006.01)
*C01C 1/00* (2006.01)
*G01P 15/093* (2006.01)
*G01P 15/18* (2013.01)

(52) U.S. Cl.
CPC .............. *G01P 15/093* (2013.01); *G01P 15/18* (2013.01)

(58) Field of Classification Search
CPC ...... G01B 11/272; G01B 11/27; G01S 3/786; B23K 26/04
USPC .............. 356/139.01, 139.07, 139.09, 141.1, 356/152.2, 399
See application file for complete search history.

(56) References Cited

U.S. PATENT DOCUMENTS

| | | | | |
|---|---|---|---|---|
| 4,746,189 | A * | 5/1988 | Arrington et al. | 385/139 |
| 4,913,548 | A * | 4/1990 | Vick | 356/461 |
| 4,963,933 | A * | 10/1990 | Brownlee | 399/186 |
| 5,317,148 | A * | 5/1994 | Gray et al. | 250/227.26 |
| 6,018,390 | A | 1/2000 | Youmans et al. | |
| 6,485,413 | B1 * | 11/2002 | Boppart et al. | 600/160 |
| 6,928,386 | B2 | 8/2005 | Hasser | |
| 7,265,736 | B2 * | 9/2007 | Lee et al. | 345/60 |
| 8,368,005 | B2 | 2/2013 | Wang et al. | |
| 8,665,440 | B1 * | 3/2014 | Kompaniets et al. | 356/419 |
| 2004/0081441 | A1 * | 4/2004 | Sato et al. | 396/52 |
| 2006/0140544 | A1 * | 6/2006 | Morimoto et al. | 385/59 |
| 2008/0130264 | A1 * | 6/2008 | Page et al. | 362/26 |
| 2009/0196543 | A1 * | 8/2009 | Lagakos et al. | 385/12 |
| 2010/0208088 | A1 * | 8/2010 | Nakai et al. | 348/208.4 |

(Continued)

*Primary Examiner* — Luke Ratcliffe
*Assistant Examiner* — Samantha K Abraham
(74) *Attorney, Agent, or Firm* — Treyz Law Group, P.C.; Zachary D. Hadd; Kendall P. Woodruff

(57) ABSTRACT

Optical accelerometers may be provided that detect acceleration in up to six axes. An optical accelerometer may include an image sensor and optical elements such as light pipes that extend over the image sensor. Light may be injected into the optical elements by a light source. The optical elements may guide the light onto corresponding portions of an image pixel array on the image sensor. The image pixels may be used to detect changes in the location, size, and intensity of illuminated portions of the pixel array when the optical elements move due to acceleration of the optical accelerometer. The optical accelerometer may include multiple light pipes having various lengths and thicknesses. Light pipes of matching length and thickness may be formed over opposing sides of a pixel array. The light pipes may be coated with a material that responds to electric or magnetic fields.

18 Claims, 4 Drawing Sheets

(56) References Cited

U.S. PATENT DOCUMENTS

| | | | |
|---|---|---|---|
| 2010/0241100 A1* | 9/2010 | Blumenfeld et al. | 604/503 |
| 2011/0282618 A1* | 11/2011 | Barbier et al. | 702/128 |
| 2012/0013900 A1* | 1/2012 | Karassiouk | 356/243.8 |
| 2012/0025341 A1* | 2/2012 | van Arendonk | 257/443 |
| 2012/0116709 A1 | 5/2012 | Martin et al. | |

* cited by examiner

OPTICAL ACCELEROMETERS

This application claims the benefit of provisional patent application No. 61/619,369, filed Apr. 2, 2012, which is hereby incorporated by reference herein in its entirety.

BACKGROUND

This relates generally to imaging systems, and more particularly, to optical accelerometers.

Accelerometers based on semiconductor technology such as piezoelectric technologies or strain gauge technologies are often used for measuring the acceleration of an object such as an electronic device. Accelerometers are also sometimes used to determine the orientation of an electronic device in a gravitational field. For example, accelerometers are commonly included in mobile phones and tablet computers for determining the orientation of the device with respect to the Earth's gravitational field.

Conventional accelerometers of this type can have relatively small ranges of acceleration measurement. Multiple sensors are therefore often necessary to cover large range applications. In addition, these sensors can be affected by electrical and magnetic fields that are separate from the physical acceleration and orientation of the sensor platform, resulting in low quality measurements.

It would therefore be desirable to be able to provide improved accelerometers.

DETAILED DESCRIPTION

An optical accelerometer is provided. The optical accelerometer may include an image sensor and optical elements mounted over the image sensor that move due to their own inertia when the optical accelerometer is moved or changes orientation. Optical accelerometers may be provided as standalone devices or may be embedded in a larger system such as a mobile phone, a vehicle, or other system that experiences measurable accelerations.

Figure 1:
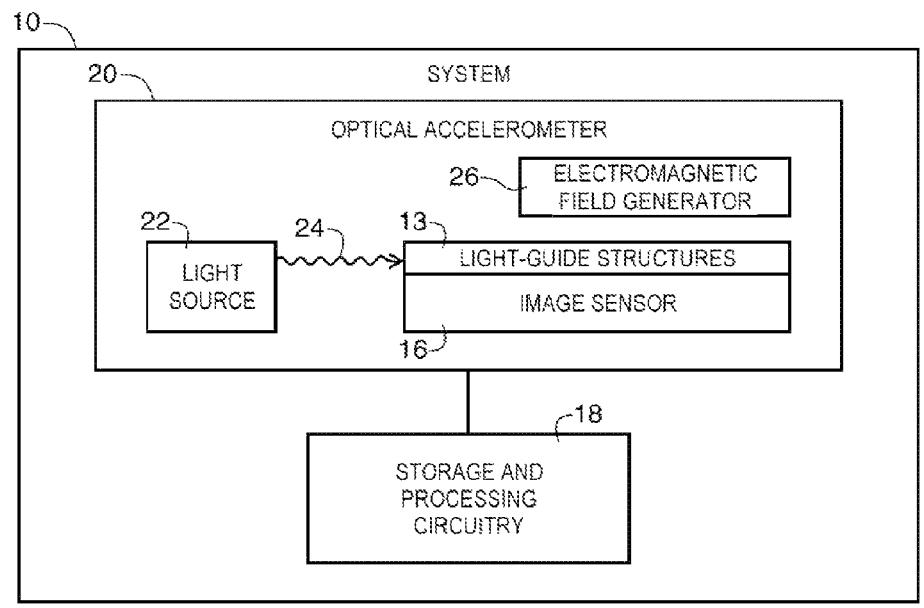
FIG. 1 is a diagram of an illustrative system that contains an optical accelerometer in accordance with an embodiment of the present invention.

FIG. 1 is a diagram of an illustrative system that includes an optical accelerometer. System 10 of FIG. 1 may be a portable electronic device such as a camera, a cellular telephone, a video camera, a computer, or other electronic device. Optical accelerometer 20 may be coupled to storage and processing circuitry 18.

Optical accelerometer 20 may include an image sensor such as image sensor 16. Image sensor 16 may include an array of image pixels such as complementary-metal-oxide-semiconductor (CMOS) image pixels, charged-coupled-device (CCD) image pixels or other image pixels. Light-guide structures 13 may be mounted on image sensor 16. Light-guide structures 13 may include optical elements that extend over image pixels in image sensor 16.

Optical accelerometer 20 may include a light source such as light source 22 (e.g., one or more light-emitting diodes) that generate light 24. Light 24 from light source 22 may be injected into light-guide structures 13. Light-guide structures 13 may guide light 24 through optical elements and onto image pixels in image sensor 16. Image sensor 16 may be used to capture images of the optical elements in light-guide structures 13.

Light-guide structures 13 may include optical elements such as light pipes oriented in multiple directions over image sensor 16 so that accelerometer 20 can detect motions such as linear motions, rotational motions, and vibrational motions. For example, optical accelerometer 20 may be a six-axis optical accelerometer capable of detecting acceleration along three linear axes of motion and three rotational axes of motion.

Processing circuitry such as storage and processing circuitry 18 may be used to determine how system 10 (or accelerometer 20) is accelerating or how system 10 (or accelerometer 20) is oriented (e.g., vertically, horizontally, etc.) in the Earth's gravitational field. If desired, light-guide structures 13 may also include one or more lenses that direct image light from a scene onto a portion of image sensor 16. In this way, image sensor 16 may serve as an imaging device as well as a portion of an optical accelerometer.

In configurations in which system 10 includes an imaging device (e.g., when image sensor 16 or another image sensor within system 10 is used to capture images while optical accelerometer 20 gathers acceleration data), the acceleration data may be combined with the image data (e.g., using storage and processing circuitry 18) to perform image corrections based on the acceleration data. As examples, circuitry 18 may use acceleration data gathered by accelerometer 20 to determine the motion of a camera for stitching together multiple images, to correct for motions such as vibrations of system 10 (e.g., for image stabilization operations for a video imaging system) or to perform other motion correction or motion tracking operations for system 10.

If desired, optical accelerometer 20 may include a field generator such as electromagnetic field generator 26. Electromagnetic field generator 26 may generate electric and/or magnetic fields that cause optical elements in light-guide structures 13 to vibrate or oscillate in a known way. This motion can then be subtracted from measured movements of the optical elements. Changes in the vibrational motions of the optical elements can be detected using image sensor 16 and circuitry 18. The detected changes can be used to measure the presence and strength of external fields such as the Earth's magnetic field. In this way, optical accelerometer 20 may also be used as an electronic compass.

Processing circuitry 18 may include one or more integrated circuits (e.g., image processing circuits, microprocessors, storage devices such as random-access memory and non-volatile memory, etc.) and may be implemented using components that are separate from optical accelerometer 20 and/or components that form part of optical accelerometer 20 (e.g., circuits that form part of an integrated circuit that includes image sensor 16). Acceleration data and, if desired, image data, that has been captured using image sensor 16 of optical accelerometer 20 may be processed and stored using processing circuitry 18. Processed data may, if desired, be provided to external equipment (e.g., a computer or other device) using wired and/or wireless communications paths coupled to processing circuitry 18.

Figure 2:
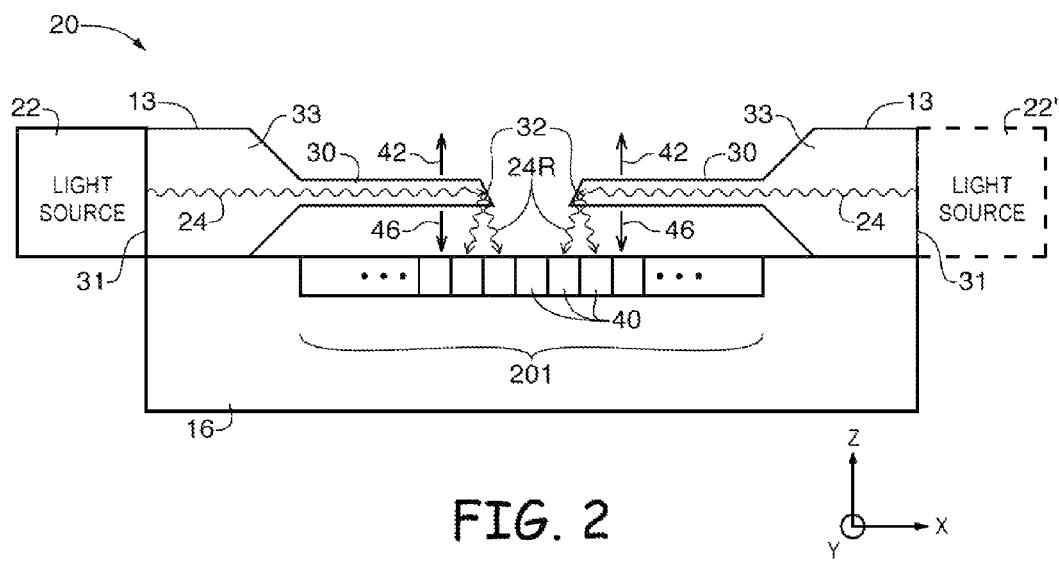
FIG. 2 is a cross-sectional view of an illustrative optical accelerometer in accordance with an embodiment of the present invention.

As shown in FIG. 2, optical accelerometer 20 may be formed light-guide structures 13 that are mounted on image sensor 16 so that one or more optical elements such as light pipes 30 of structures 13 extend over a portion of image sensor 16. Light pipes 30 may extend from a base structure such as base 33 over an array of image pixels 40 such as image pixel array 201. Light-guide structures 13 may be formed form a block of optically transmissive material such as a molded plastic structure. Light-guide structures 13 may include base 33 and light pipes 30 that extend from base 33 over pixel array 201. Base 33 may have a substantially rectangular outer perimeter with a light input portion e.g., surface 31). Light source 22 (e.g., a light-emitting diode) and, if desired, additional light source 22', may inject light 24 into base 33. Light 24 may be distributed throughout structures 13 due to the principle of total internal reflection. Light pipes 30 may be attached to or extruded from base 33. As examples, light pipes 30 may form a series of optical light pipes or optical fibers that transmit light 24 from base 33 to the end of each light pipe. Each light pipe 30 may include structures 32 such as reflective structures at the end of each fiber that direct light 24 downward onto image pixels 40.

Light-guide structures 13 may include multiple light pipes 30. Light pipes 30 may be configured to be flexible so that when optical accelerometer 20 is moved, due to their own inertia, flexible light pipes 30 move with respect to image pixel array 201 (e.g., in the Opposite direction of the motion of the pixel array).

Light pipes 30 may be provided that have various lengths and diameters so that they deflect by different amounts when undergoing acceleration. In this way, an optical accelerometer may be provided with the capability of detecting and measuring a wide range of accelerations.

Light 24R from light pipes 30 may be directed onto a subset of pixels 40 on the surface of the image sensor 16 so that motion of the light pipe in a direction parallel to the surface of the imager can be detected by the varying position of the illuminated pixels in array 201 and variations in the intensity of light received by pixels 40 within the illuminated region as the motion occurs. Motion of light pipes 30 in a direction perpendicular to array 201 can be detected by detecting variations in the intensity and size of the illuminated region of pixel array 201 from each light pipe 30.

Light pipes 30 may be distributed over array 201 so that opposing sides on the imaging array receive light from opposing fibers having a common length and thickness. Linear motion of accelerometer 20 will result in both sets of opposing fibers moving in the same direction while rotational motions of accelerometer 20 will result in opposing fibers moving in opposite directions. As an example, when accelerometer 20 is moved up and down (e.g., along the z-axis of FIG. 2), light pipes 30 may move down and up (as indicated by arrows 46 and 42) opposite to the motion of accelerometer 20. As the ends of light pipes 30 move nearer or further from array 201, the size and intensity of the portion of array 201 that is illuminated will change. In this way, an optical accelerometer having opposing sets of light pipes 30 may be provided with the capability of detecting motion along three linear axes of motion (e.g., along the x, y, or z direction of FIG. 2) and three rotational axes of motion (e.g., rotation about the x, y, or z axes of FIG. 2), thereby forming full six-axis acceleration sensor with optical acceleration detection.

An accelerometer of the type shown in FIG. 2 may also be used to detect vibration of the accelerometer or to detect acoustic signals by detecting a cyclic motion of light pipes 30. Light pipes 30 with a particular range of cyclic motion may correspond to fibers that have a natural vibration rate or a harmonic that is the same as an incoming vibrational or acoustic signal. Known properties (e.g., the length and thickness) of each light pipe may be combined with the measured motion to determine the vibrational movement of the accelerometer.

Figure 3:
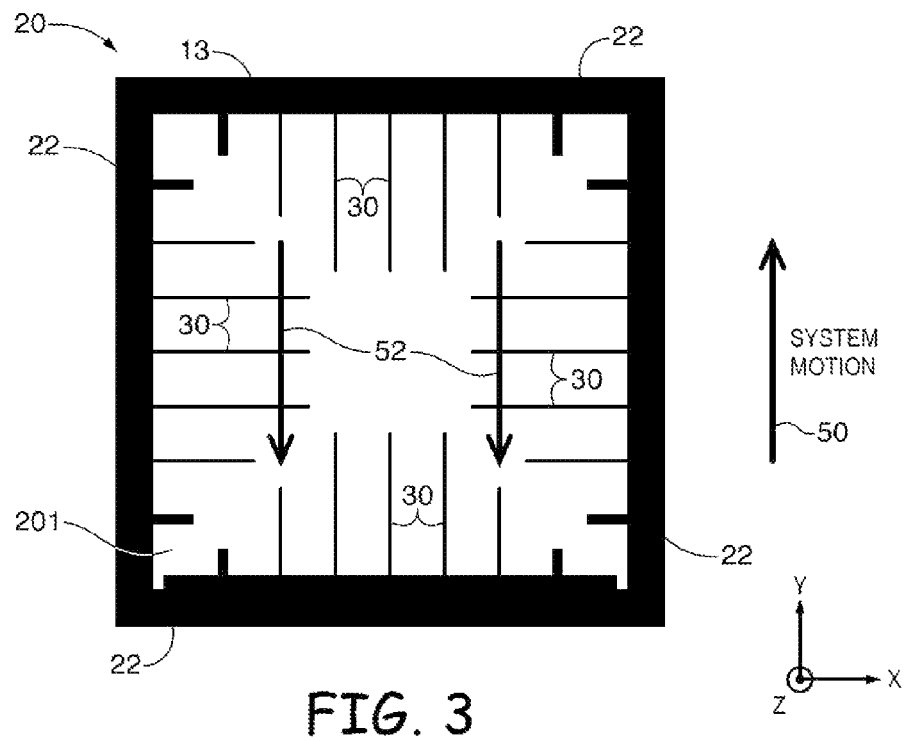
FIG. 3 is a top view of an illustrative optical accelerometer showing how light-guide elements may move over an image pixel array in the event of linear motion of the accelerometer in accordance with an embodiment of the present invention.
Figure 4:
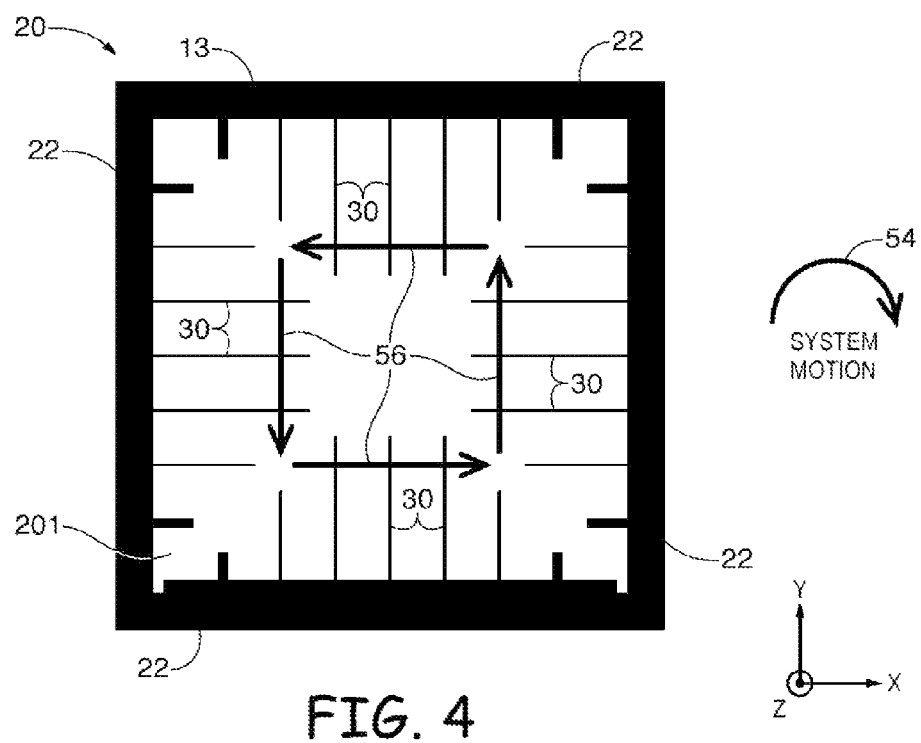
FIG. 4 is a top view of an illustrative optical accelerometer showing how light-guide elements may move over an image pixel array in the event of rotational motion of the accelerometer in accordance with an embodiment of the present invention.

FIG. 3 is a top view of optical accelerometer 20 showing how light-guide structures 13 may include multiple light pipes 30 of varying length and thickness oriented in multiple directions over image pixel array 201. Light guide structure 13 may include opposing light pipes 30 of equal length and thickness attached to for extruded from) opposing sides of base 33. As shown in FIG. 3, motion of system 10 (or of accelerometer 20) in direction 50 (e.g., linear motion) results in movement of light pipes 30 along two sides of base 33 in direction 52. As shown in FIG. 4, rotational motion of system 10 in direction 54 (e.g., rotation about the z-axis of FIG. 4) results in movement of light pipes 30 in directions 56.

Image pixel array 201 may be used to capture images of light patterns from each light pipe 30 on pixel array 201 as the light pipes move. Processing circuitry such as processing circuitry 18 may be used to determine the direction and magnitude of motion of each light pipe using the captured images. The direction and magnitude of acceleration of accelerometer 20 may be determined using the determined direction and magnitude of motion of each light pipe. Acceleration data that describes the determined direction and magnitude of acceleration of accelerometer 20 may be displayed to a user or may be provided to other components of system 10 or to other electronic devices.

If desired, processing circuitry 18 may be used to execute super resolution algorithms of images captured by image pixel array 201, thereby increasing the sensitivity of the image pixel array to motions of the fibers.

Figure 5:
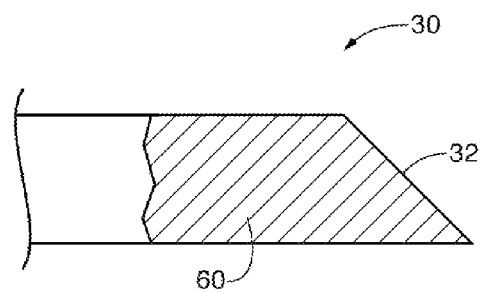
FIG. 5 is a side view of an illustrative light-guide element of an optical accelerometer in accordance with an embodiment of the present invention.

As shown in FIG. 5, one or more of light pipes 30 may be provided with a coating such as coating 60. Coating 60 may be formed on an end portion of light pipe 30 or may cover substantially all of light pipe 30. Coating 60 may be a magnetically and/or electrically responsive structure such as a metallic coating. Light pipes 30 having coating 60 may move in response to external magnetic or electrical fields. The direction and strength of the external fields may be determined by capturing images of light pipes 30 having coatings 60 as they move over an image pixel array.

If desired, optical accelerometer 20 may include electrical or magnetic field generation circuits such as electromagnetic field generator 26. Fields generated by generator 26 may be used to dampen the response of the light pipes 30 to acceleration or vibration signals. In this way, the acceleration detection range of the optical accelerometer 20 may be tuned and/or the sensitivity of the optical accelerometer 20 to vibrations may be reduced.

For example, oscillating electrical or magnetic fields can be applied to appropriately fabricated light pipes 30 (e.g., fibers coated with material 60) to cause them to oscillate at a given rate and magnitude. In this type of arrangement, acceleration of accelerometer 20 will cause a shift in the magnitude of the oscillation of light pipes 30 and provide an alternative method of measurement that can be more sensitive than a static sensor.

If desired, material 60 may be formed from biologically reactive materials. In this type of configuration, accelerometer 20 may be used to detect environmental or biological events. The oscillation patterns of oscillating light pipes 30 may be calibrated and, after initial calibration, any changes in the mass or stiffness of the fibers due to environmental interactions will be detectable as shifts in the motion of the fibers.

Figure 6:
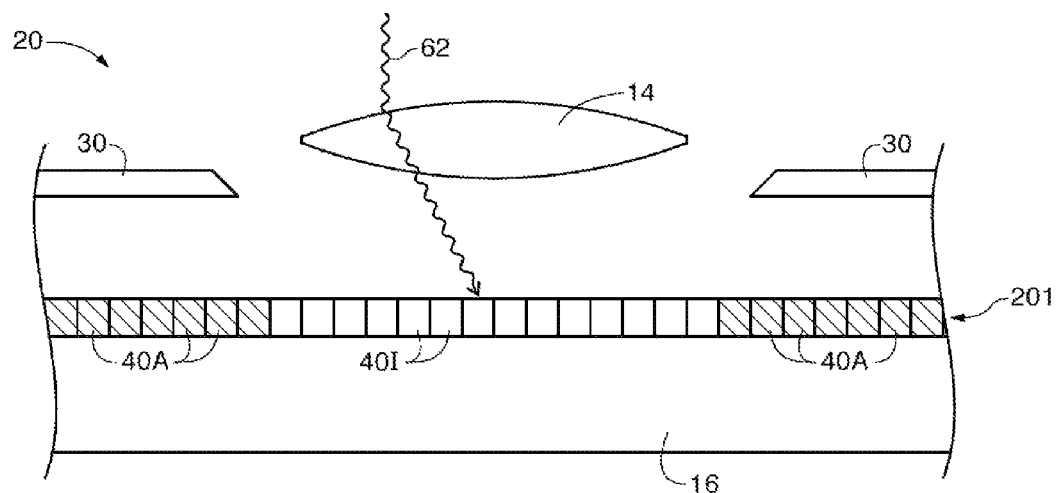
FIG. 6 is a cross-sectional view of an illustrative optical accelerometer having an image pixel array with an imaging portion and an acceleration detection portion in accordance with an embodiment of the present invention.

Optical accelerometer 20 may be a dedicated optical accelerometer or may be provided with additional capabilities such as image capture capabilities. As shown in FIG. 6, optical accelerometer 20 may be provided with one or more lenses such as lens 14. Lens 14 may focus image light such as light 62 from a scene onto image pixels 401 of image pixel array 201. In this type of configuration, only a portion of image pixel array 201 may be used for acceleration detection operations. In the example of FIG. 6, acceleration detection pixels 40A are arranged along the edges of array 201 and image capture pixels 401 are arranged in the center of array 201. However, this is merely illustrative. If desired, any portion of image pixel array 201 may be used for acceleration detection operations and arty portion of image pixel array 201 may be used for image capture operations.

Figure 7:
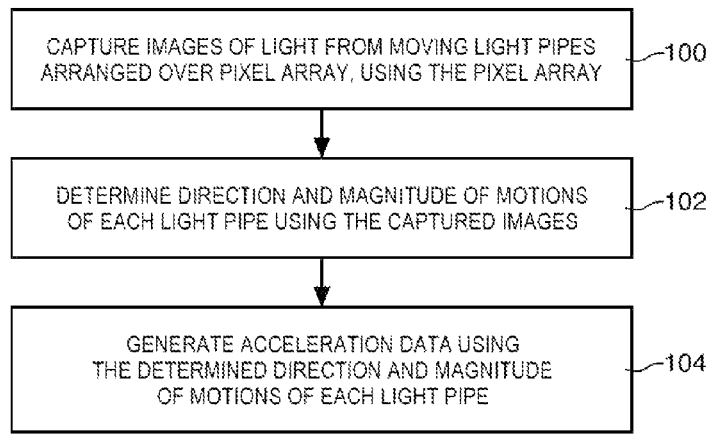
FIG. 7 is a flow chart of illustrative steps that may be involved in measuring accelerations in six axes using an optical accelerometer in accordance with an embodiment of the present invention.
Figure 8:
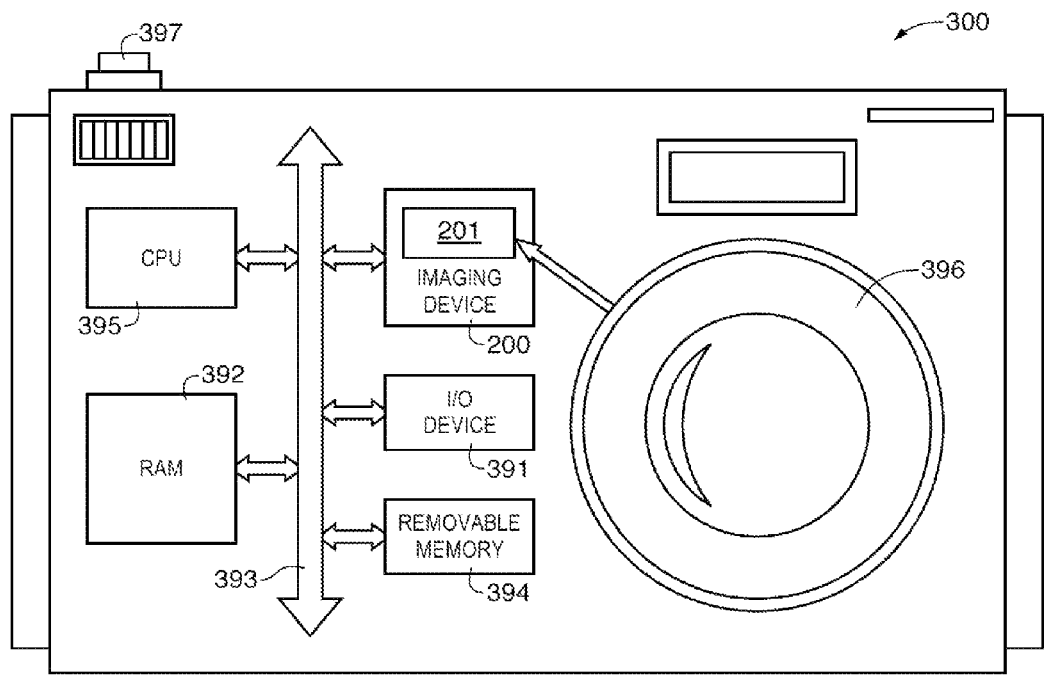
FIG. 8 is a block diagram of a processor system that may include an optical accelerometer in accordance with an embodiment of the present invention.

Illustrative steps that may be used in measuring acceleration with an optical accelerometer such as optical accelerometer 20 are shown in FIG. 7.

At step 100, an image pixel array such as image pixel array 201 may be used to capture images of light from a set of light pipes that are arranged over the pixel array as they move over the image pixel array.

At step 102, the direction and magnitude of the motions of each light pipe may be determined using the captured images.

At step 104, acceleration data that describes the determined direction and magnitude of acceleration of the optical accelerometer may be generated. The generated acceleration data may be displayed to a user or may be provided to other components of system 10 or to other electronic devices.

FIG. 6 shows in simplified form a typical processor system 300, such as a digital camera, which includes an imaging device such as imaging device 200. Imaging device 200 may, for example, be an optical accelerometer such as optical accelerometer 20 having an image pixel array 201. Processor system 300 is exemplary of a system having digital circuits that could include imaging device 200. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

Processor system 300, which may be a digital still or video camera system, may include a lens such as lens 396 for focusing an image onto a pixel array such as pixel array 201 when shutter release button 397 is pressed. Processor system 300 may include a central processing unit such as central processing unit (CPU) 395. CPU 395 may be a microprocessor that controls camera functions and one or more image flow functions and communicates with one or more input/output (I/O) devices 391 over a bus such as bus 393. Imaging device 200 may also communicate with CPU 395 over bus 393. System 300 may include random access memory (RAM) 392 and removable memory 394. Removable memory 394 may include flash memory that communicates with CPU 395 over bus 393. Imaging device 200 may be combined with CPU 395, with or without memory storage, on a single integrated circuit or on a different chip. Although bus 393 is illustrated as a single bus, it may be one or more buses or bridges or other communication paths used to interconnect the system components.

Various embodiments have been described illustrating optical accelerometers and systems that include optical accelerometers. An optical accelerometer may include an image sensor and optical elements mounted over the image sensor that move due to their own inertia when the optical accelerometer is moved or changes orientation. The optical elements may be light-guide structures such as light pipes (e.g., light pipes formed from molded plastic or optical fibers) that direct light from a light source onto the image sensor. The image sensor gathers incoming light to capture images of optical elements and or illumination patterns from the optical elements as they move over the image sensor.

An image sensor may include an array of image sensor pixels. The image sensor pixels in the image sensor may include photosensitive elements such as photodiodes that convert the incoming light into electric charges. Image sensors may have any number of pixels (e.g., hundreds or thousands or more). A typical image sensor may, for example, have hundreds, thousands, or millions of image sensor pixels (e.g., megapixels).

An optical accelerometer may include a light source that injects light into the optical elements and processing, circuitry configured to generate acceleration data based on images of the optical elements. If desired, the optical accelerometer may include an electromagnetic field generator that generates electric and/or magnetic fields for driving oscillations of the optical elements in order to reduce measurement noise and or detect external electric or magnetic fields using the acceleration data.

The foregoing is merely illustrative of the principles of this invention which can be practiced in other embodiments.

What is claimed is:

1. An optical accelerometer, comprising:
   an image sensor; and
   light-guide structures on the image sensor, wherein the light-guide structures include optical elements that extend over the image sensor, wherein the optical elements are configured to move when the light-guide structures are moved, wherein each of the optical elements comprises a first end that receives light from a light source and that remains in a fixed position such that the first end does not move with respect to the image sensor during motion of the optical accelerometer and a second end opposite the first end that directs light onto the image sensor and that moves with respect to the image sensor in response to the motion of the optical accelerometer, and wherein the image sensor is configured to capture images of light from the light-guide structures during the motion; and
   processing circuitry configured to extract acceleration information from the captured images.

2. The optical accelerometer defined in claim 1 wherein the light-guide structures comprise a base and wherein the optical elements comprise a plurality of light pipes that extend from the base and receive the light from the base.

3. The optical accelerometer defined in claim 2 wherein each light pipe includes a reflective structure at an end of that light pipe that reflects a portion of the light onto the image sensor.

4. The optical accelerometer defined in claim 3 wherein the plurality of light pipes that extend from the base comprise a first plurality of light pipes that extend from a first side of the base and a second plurality of light pipes that extend from an opposing second side of the base.

5. The optical accelerometer defined in claim 4 wherein the first plurality of light pipes each has a length and wherein the length of at least one of the first plurality of light pipes is different from the length of at least another one of the first plurality of light pipes.

6. The optical accelerometer defined in claim 4 wherein the first plurality of light pipes each has a thickness and wherein the thickness of at least one of the first plurality of light pipes is different from the thickness of at least another one of the first plurality of light pipes.

7. The optical accelerometer defined in claim 4 wherein a selected light pipe in the first plurality of light pipes and an opposing light pipe in the second plurality of light pipes have a common length and a common thickness.

8. The optical accelerometer defined in claim 4, further comprising:
   a third plurality of light pipes that extend from a third side of the base; and
   a fourth plurality of light pipes that extend from a fourth side of the base that opposes the third side of the base.

9. The optical accelerometer defined in claim 1, further comprising a coating on at least one of the optical elements.

10. The optical accelerometer defined in claim 9 wherein the coating comprises an electrically responsive structure.

11. The optical accelerometer defined in claim 10, further comprising an electromagnetic field generator that generates electromagnetic fields that control motion of the at least one of the optical elements.

12. The optical accelerometer defined in claim 9 wherein the coating comprises a biologically reactive coating.

13. A method of detecting acceleration using an optical accelerometer having a plurality of light pipes that extend over an image pixel array and that move relative to the image pixel array due to motion of the optical accelerometer, the method comprising:
   using the image pixel array, capturing images of light from the plurality of light pipes while the light pipes are in motion relative to the image pixel array due to the motion of the optical accelerometer;
   with an electromagnetic field generator, generating an electromagnetic field that adjusts the motion of the light pipes;
   determining a direction and a magnitude of the motion of the plurality of light pipes using the captured images; and
   generating acceleration data using the determined direction and the determined magnitude of the motions of the plurality of light pipes.

14. The method defined in claim 13 wherein determining the direction and the magnitude of the motion of the plurality of light pipes using the captured images comprises detecting a change in position of illuminated portions of the image pixel array that are illuminated by the plurality of light pipes.

15. The method defined in claim 13 wherein determining the direction and the magnitude of the motion of the plurality of light pipes using the captured images comprises detecting a change in size of illuminated portions of the image pixel array that are illuminated by the plurality of light pipes.

16. A system, comprising:
   a central processing unit;
   memory;
   input-output circuitry; and
   an imaging device, wherein the imaging device comprises:
      a lens,
      a light source,
      a plurality of image pixels including acceleration detection pixels, and
      a plurality of flexible light pipes, wherein each of the flexible light pipes has a first end into which the light source emits light and a second end opposite the first end that directs the light onto the acceleration detection pixels, wherein each of flexible light pipes comprises a reflective structure attached directly to the second end that directs the light out of the second end and onto the acceleration detection pixels, and wherein the acceleration detection pixels detect acceleration of the imaging device in response to movement of the flexible light pipes relative to the plurality of image pixels.

17. The system defined in claim 16 wherein the plurality of image pixels includes a plurality of image capture pixels.

18. The system defined in claim 17 wherein the image capture pixels receive light from the lens.

* * * * *